United States Patent [19]

Koga et al.

[11] Patent Number: 4,724,936

[45] Date of Patent: Feb. 16, 1988

[54] FLUID-FILLED BUSHING WITH VARIABLE DAMPING FORCES

[75] Inventors: Kiyoshi Koga; Tsunehiko Fukatsu; Masaru Yorita, all of Saitama, Japan

[73] Assignee: Honda Giken Kogyo Kabushiki Kaisha, Tokyo, Japan

[21] Appl. No.: 1,037

[22] Filed: Jan. 7, 1987

[30] Foreign Application Priority Data

Jan. 13, 1986 [JP] Japan ................... 61-3929[U]

[51] Int. Cl.⁴ .................................... F16F 9/14
[52] U.S. Cl. ............................ 188/308; 188/130; 267/140.1
[58] Field of Search ............ 188/306, 307, 308, 309, 188/130; 267/35, 64.11, 64.27, 64.28, 113, 140.1

[56] References Cited

U.S. PATENT DOCUMENTS

| | | | |
|---|---|---|---|
| 1,852,755 | 4/1932 | Peo | 188/307 X |
| 1,906,643 | 5/1933 | Simon | 188/307 |
| 1,940,694 | 12/1933 | Peo | 188/308 X |

*Primary Examiner*—Duane A. Reger
*Attorney, Agent, or Firm*—Irving M. Weiner; Joseph P. Carrier; Pamela S. Burt

[57] ABSTRACT

A fluid-filled bushing with variable damping forces includes an inner tube, an outer tube, an elastomeric body joining the inner and outer tubes, a plurality of fluid chambers defined by the elastomeric body between the inner and outer tubes in circumferentially spaced relationship, a fluid passage for providing communication between the fluid chambers, a valve disposed in the inner tube for controlling fluid flow through the fluid passage, and a valve actuator for actuating the valve. The fluid passage includes a plurality of first passages defined in the inner tube and each communicating with one of the fluid chambers, and a plurality of second passages defined in the valve and communicable with the first fluid passages, respectively, the second fluid passages cooperating with the first fluid passages in varying cross-sectional areas thereof. A flange is provided on the inner tube at one axial end thereof for attachment to a vehicle frame, and a valve actuator is mounted on the flange remotely from the inner tube for actuating the valve.

4 Claims, 3 Drawing Figures

FLUID-FILLED BUSHING WITH VARIABLE DAMPING FORCES

BACKGROUND OF THE INVENTION

1. Field of the Invention

The present invention relates to a fluid-filled bushing, and more particularly to a fluid-filled bushing with variable damping forces which is to be disposed between a suspension member of a vehicle and a frame of the vehicle.

2. Description of the Relevant Art

Generally, vibro-isolating rubber bushings capable of damping vibration are disposed between suspension members of vehicles and vehicle frames on which the suspension members are pivotally mounted. It is desired that such bushings produce relatively large damping forces in order to provide good vehicle maneuverability, an ability for the vehicle to run straight at high speed, and to keep the vehicle stable in its attitude when it is started or stopped. However, from the standpoint of providing good riding comfort and preventing vibration and noise from being trasnsmitted from wheels, the bushings are required to have relatively small damping forces.

Japanese Laid-Open Patent Publication No. 59-116649 discloses a bushing with variable damping forces which meets such contradictory requirements. The disclosed bushing is mounted on a frame-supported portion of a suspension arm which supports a wheel for movement in the longitudinal direction of a vehicle frame, and comprises an inner tube coupled to the vehicle frame, two outer tubes connected to an end of the suspension arm, and a body of vibro-isolating rubber interconnecting the inner and outer tubes. The rubber body has two fluid chambers defined therein in circumferentially spaced relation, and the fluid chambers can communicate with each other through an annular passage defined between the two outer tubes. The fluid chambers and annular passage are filled with a fluid. The annular passage is selectively opened and closed by a valve body which is actuated by an actuator mounted on the outer periphery of the radially outward outer tube, for movement into and out of the annular passage. The damping force produced by the bushing is varied by such selective opening and closing of the annular passage. In the above fluid-filled bushing with variable damping forces, the valve body actuator projects outwardly from the outer tube. Therefore, an installation space for the actuator has to be provided on the bushing, and a special measure must be taken to protect the actuator against external forces.

SUMMARY OF THE INVENTION

Accordingly, it is an object of the present invention to provide a fluid-filled bushing with variable damping forces which includes a valve actuator that does not project radially outwardly of the bushing, and which does not require any valve actuator installation space radially outwardly of the bushing as installed.

Another object of the present invention is to provide a fluid-filled bushing with variable damping forces in which a valve actuator is effectively protected from external forces without the need of taking any special measure.

According to the present invention, there is provided a fluid-filled bushing with variable damping forces, including inner and outer tubes radially spaced from each other in coaxial relationship, an elastomeric body joining the inner and outer tubes to each other, a plurality of fluid chambers defined by the elastomeric body between the inner and outer tubes in circumferentially spaced relationship, a plurality of first fluid passages defined in the inner tube and each communicating with one of the fluid chambers, a valve disposed coaxially in the inner tube, a plurality of second fluid passages defined in the valve and communicable with the first fluid passages, respectively, the second fluid passages cooperating with the first fluid passages in varying cross-sectional areas thereof, a flange provided on the inner tube at one axial end thereof for attachment to a vehicle frame, and a valve actuator mounted on the flange remotely from the inner tube for actuating the valve.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
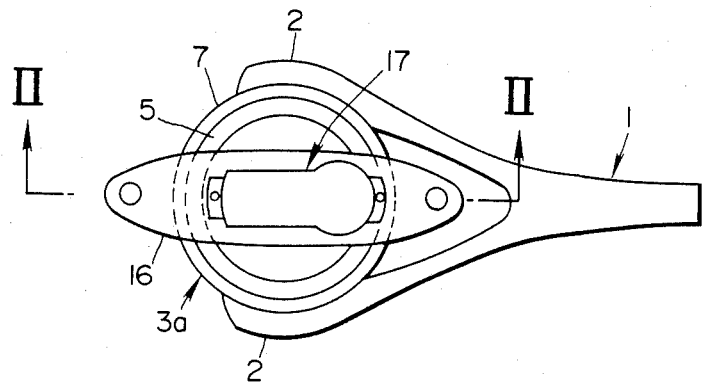
FIG. 1 is an elevational view of a fluid-filled bushing according to the present invention and a suspension arm on which the bushing is mounted.

As shown in FIG. 1, a rod 1, which is one of a plurality of suspension arms, is bifurcated at its end for attachment to a vehicle frame, into two legs 2 having distal end portions with their inner surfaces curved as arcuated surfaces extending along the outer periphery of a fluid-filled bushing 3 and fixed thereto.

Figure 2:
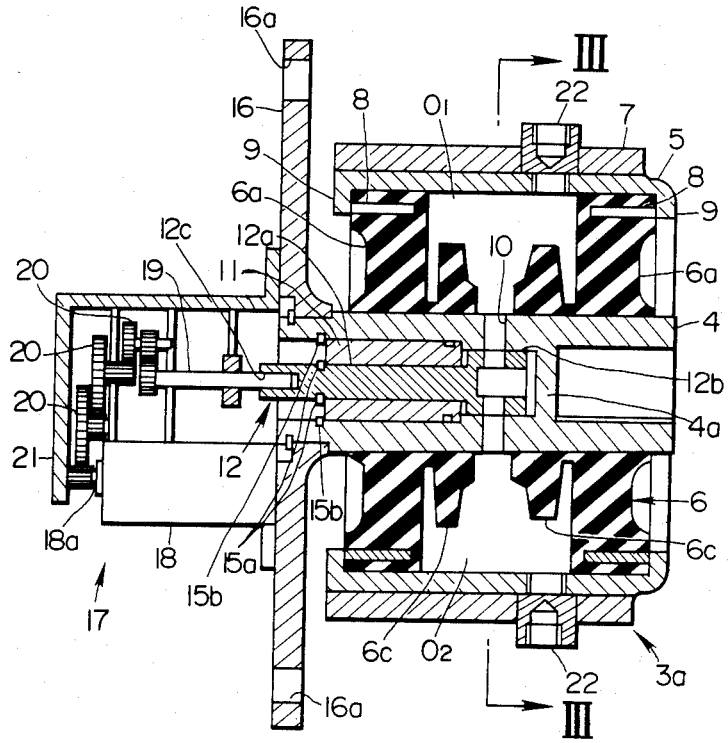
FIG. 2 is an enlarged cross-sectional view taken along line II—II of FIG. 1.
Figure 3:
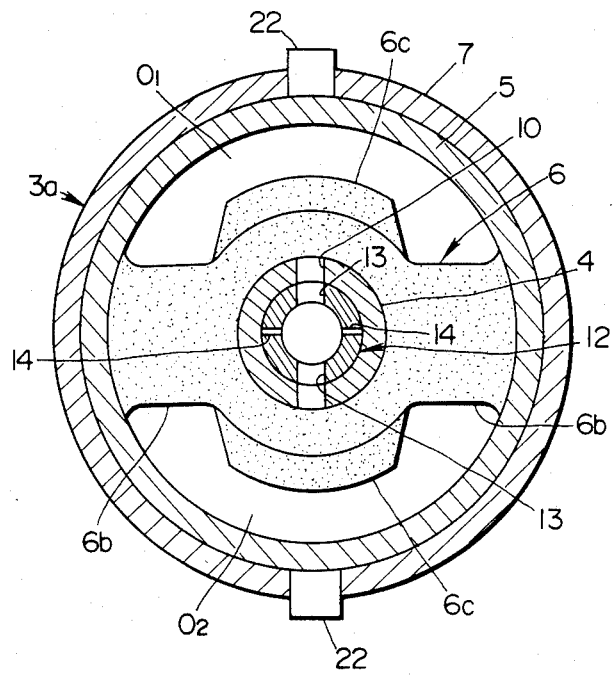
FIG. 3 is a cross-sectional view taken along line III—III of FIG. 2.

The fluid-filled bushing 3 has a bushing body 3a comprising, as shown in FIGS. 2 and 3, an inner tube 4, an outer tube 5, a rubber wall structure 6 joining the inner and outer tubes 4, 5, and a holder tube 7 holding the outer tube 5 therein. The rubber wall structure 6 is fixed, by curing, to the outer periphery of the inner tube 4 and the inner periphery of the outer tube 5. The rubber wall structure 6 comprises a pair of axially spaced rubber walls 6a (FIG. 2) closing the space between the inner and outer tubes 4, 5 at opposite axial ends thereof, and a pair of rubber walls 6b (FIG. 3) positioned at an axially or longitudinally intermediate position of the inner and outer tubes 4, 5 and dividing the space therebetween into two fluid chambers O1, O2 that are circumferentially spaced from each other. The rubber walls 6b have stopper projections 6c projecting radially outwardly of the inner tube 12 into the fluid chambers O1, O2 for preventing excess radial flexure. Restraint ring plates 8 of metal are embedded respectively in the rubber walls 6a near their outer peripheries for reinforcing the curing thereof to the outer tube 5.

The opposite axial ends of the outer tube 5 are bent into radially inward flanges 9, respectively, pressed against the axial ends of the restraint ring plates 8. The outer tube 5 is fitted in the holder tube 7.

A pair of diametrically opposite passages 10 is defined through an axially or longitudinally intermediate portion of the inner tube 4 for providing fluid communication between the fluid chambers O1, O2. The inner tube 4 has a partition 4a on one side of the passages 10. A valve 12 is rotatably fitted in the inner tube 4 on one side of the partition 4a where the passages 10 are defined, and is retained in position by a valve holder 11. The valve 12 comprises a smaller-diameter rod 12a and a larger-diameter portion 12b on one end of the smaller-diameter rod 12a, with the rod 12a being fitted in the valve holder 11. The rod 12a has an axial hole 12c defined in its end remote from the larger-diameter portion 12b. As shown in FIG. 3, the larger-diameter portion 12b have two pairs of radially extending valve holes 13, 14. The valve holes 13 which are diametrically opposite are of the same diameter as that of the passages 10, and the valve holes 14 are spaced 90° from the valve holes 13 and are of a smaller diameter.

In assembly, the valve holder 11 is fitted over the rod 12a of the valve 12 and secured in position by an E-shaped retaining ring 15a. Then, the valve 12 and the valve holder 11 are inserted into the inner tube 4 and secured in place by another E-shaped retaining ring 15b. With the valve 12 thus inserted, the valve holes 13, 14 are radially aligned with the passages 10.

A flange 16 is fixed to the outer periphery of an end of the inner tube 4 for attachment to a vehicle frame. The flange 16 has holes 16a through which the flange 16 is attached by screws or the like (not shown) to the vehicle frame. A valve actuator 17 for actuating the valve 12 is disposed on one side (lefthand side in FIG. 2) of the flange 16 where the vehicle frame is attached.

The valve actuator 17 comprises an electric motor 18, an actuator shaft 19 having an end fitted in the axial hole 12c of the valve 12, and a train of speed reducer gears 20 coupled between the output rod 18a of the motor 18 and the actuator shaft 19. These actuator members are covered with a cover 21. Energization of the motor 18 rotates the valve 12 to bring the larger valve holes 13 into registry with the passages 10, the smaller valve holes 14 into registry with the passages 10, or the larger and smaller valve holes 13, 14 out of registry with the passages 10.

Drain fittings 22 are mounted on the holder tube 7. A working fluid can be introduced into the bushing body 3a by first removing drain cocks (not shown) from the drain fittings 22, then pouring the working fluid while forcing air out of the fluid chambers O1, O2, and finally threading the drain cocks into the drain fittings 22.

The inner tube 4 of the bushing 3 is fixed to the vehicle frame through the flange 16, and the distal end of the rod 1 (FIG. 1) is pivotally mounted on a wheel supporting member such as an axle housing, for example. The rod 1 thus attached extends longitudinally of the vehicle.

In operation, the rod 1 is moved longitudinally as the wheel moves. At this time, the working fluid flows from the fluid chamber O1 through the passages 10 into the fluid chamber O2 or from the fluid chamber O2 through the passages 10 into the fluid chamber O1, thus producing a damping force. If the larger valve holes 13 are held in registry with the passages 10 at this time, the working fluid in the bushing 3 as it flows through the valve holes 13 is not restricted by the valve holes 13, and hence the damping force produced by the bushing 3 is relatively small to increase the compliance in the longitudinal direction of the vehicle. Conversely, if the smaller valve holes 14 are held in registry with the passages 10, the working fluid in the bushing 3 is restricted by the valve holes 13, and hence the damping force produced by the bushing 3 is increased, resulting in smaller compliance in the longitudinal direction of the vehicle.

When the valve 12 is rotated to position the valve holes 13, 14 out of registry with the passages 10, the fluid communication between the fluid chambers O1, O2 is cut off, and consequently the damping force of the bushing 3 is maximized for miminum compliance.

While the valve 12 has two pairs of valve holes in the illustrated embodiment, it may alternately have three angularly spaced pairs of valve holes, for example. Further, the valve 12 and the actuator 17 may be replaced with a solenoid-operated valve.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A fluid-filled bushing with variable damping forces, comprising:
   inner and outer tubes radially spaced from each other in coaxial relationship;
   an elastomeric body joining said inner and outer tubes to each other;
   a plurality of fluid chambers defined by said elastomeric body between said inner and outer tubes in circumferentially spaced relationship;
   a plurality of first fluid passages defined in said inner tube and each communicating with one of said fluid chambers;
   a valve disposed coaxially in said inner tube;
   a plurality of second fluid passages defined in said valve and communicable with said first fluid passages, respectively, said second fluid passages cooperating with said first fluid passages in varying cross-sectional areas thereof;
   a flange provided on said inner tube at one axial end thereof for attachment to a vehicle frame; and
   a valve actuator mounted on said flange remotely from said inner tube for actuating said valve.

2. A fluid-filled bushing according to claim 1, wherein said valve is disposed in said inner tube for angular movement about its own axis.

3. A fluid-filled bushing according to claim 2, wherein said second fluid passages comprise through holes defined radially through said valve at different angles and having different cross-sectional areas.

4. A fluid-filled bushing according to claim 1, wherein said valve actuator comprises an electric motor having an output shaft, an actuator shaft coupled to said valve for rotating the same about its own axis, and a train of speed reducer gears coupled between said output shaft and said actuator shaft.

* * * * *

UNITED STATES PATENT AND TRADEMARK OFFICE
CERTIFICATE OF CORRECTION

PATENT NO. : 4,724,936

DATED : February 16, 1988

INVENTOR(S) : Kiyoshi KOGA et al

It is certified that error appears in the above-identified patent and that said Letters Patent is hereby corrected as shown below:

Column 3, line 11, change "have" to -- has --

Signed and Sealed this

Twelfth Day of July, 1988

Attest:

DONALD J. QUIGG

*Attesting Officer*     *Commissioner of Patents and Trademarks*